Feb. 21, 1950
A. WINTHER
2,498,057
CONTROL APPARATUS FOR POLYPHASE SYSTEMS
Original Filed May 4, 1944
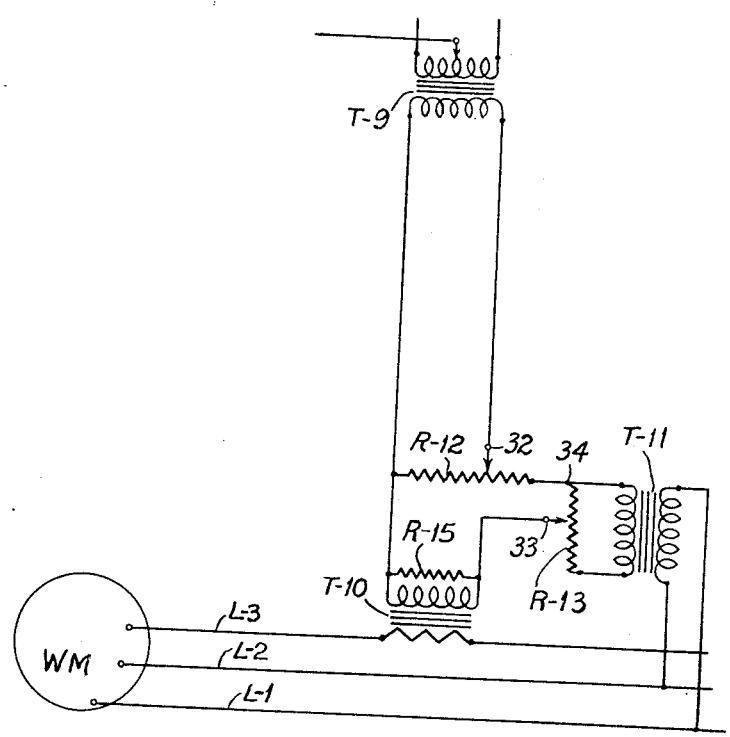
Anthony Winther,
Inventor.
Haynes and Koenig,
Attorneys.

Patented Feb. 21, 1950

2,498,057

UNITED STATES PATENT OFFICE 2,498,057

CONTROL APPARATUS FOR POLYPHASE SYSTEMS

Anthony Winther, Kenosha, Wis., assignor to Martin P. Winther, Waukegan, Ill., as trustee Original application May 4, 1944, Serial No. 534,111. Divided and this application March 20, 1946, Serial No. 655,699

2 Claims. (Cl. 171—97)

1

This invention relates to control apparatus for polyphase systems, and with regard to certain more specific features, to a voltage control.

This application is a division of my United States patent application Serial No. 534,111, filed May 4, 1944, for Electronic control apparatus, issued as Patent 2,469,706, dated May 10, 1949.

Among the several objects of the invention may be noted the provision of means for producing a voltage in response to current in a multi-phase A. C. circuit supplying an A. C. motor under variable load such that the voltage will be proportional to motor torque. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, The single figure is a wiring diagram of the connections required for the invention.

Referring now more particularly to the drawing, T-9 indicates a transformer and WM an A. C. motor. The primary of the transformer T-9 is energized from an A. C. circuit through means adapted to provide a voltage which is substantially a straight-line function of the torque delivered by the A. C. motor WM. This is accomplished by means of a current transformer T-10 having a primary in the line L-3 and a secondary which feeds the primary of the transformer T-9. Thus transformer T-10 is in one phase of the multi-phase A. C. circuit L-1, L-2, L-3. Resistance R-15 is connected across the secondary of the transformer T-10. This provides a load.

A voltage transformer T-11 has its primary connected across the lines L-1 and L-2 of the A. C. circuit. Thus it is connected across another phase of the A. C. circuit. Resistance R-13 forming a resistance load and first potentiometer is connected across its secondary and has a variable tap 33 connected to the secondary of transformer T-10. Point 34 of transformer T-11 is connected to the variable tap 32 of a third resistance load R-12 which acts as a second potentiometer. By a suitable adjustment of the resistances R-12 and R-13, the transformer T-11 can be caused to buck down such component of current generated in the transformer T-10 as

2 is caused by the magnetizing requirements of the motor WM. The transformer T-11 is so connected, and 32 and 33 are so adjusted, that the voltage generated by T-11 cancels the voltage generated by the transformer T-10 when the motor is idling. Resistances R-12, R-13 and R-15 are series connected. Thus the load-ampere curve of the motor is substantially a straight line and the effect is to correct for power factor. The circuit between transformers T-9, T-10 and T-11 may be referred to as a transformer circuit for obtaining a straight-line relationship between the voltage on T-9 and torque on the motor WM. Potentiometer R-13 is the one that bucks out magnetizing current and R-12 changes the slope of the straight-line voltage-current relationship.

Since the current drawn in line L-3 by the motor WM is practically proportional to the torque of the motor, and since the transformer T-11 bucks out the magnetizing current, control is unaffected by such magnetizing current and the voltage output of transformer T-9 is therefore substantially proportional to motor torque.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. Voltage control apparatus for producing voltage in a constant proportion to torque of a variable-load A. C. motor fed by a multi-phase A. C. circuit, comprising a current transformer having a primary in one phase of the A. C. circuit, a voltage transformer having a primary connected across another phase of said A. C. circuit, series-connected resistance loads respectively fed by the secondaries of said transformers, a third resistance load connected in series with said two resistance loads, the values of the resistances being such that the secondary voltage of said voltage transformer bucks out substantially all of the secondary voltage of said current transformer when the motor is idling.

2. Voltage control apparatus for producing voltage in a constant proportion to torque of a variable-load A. C. motor fed by a multi-phase A. C. circuit, comprising a current transformer having a primary in one phase of the A. C. circuit, a voltage transformer having a primary connected across another phase of said A. C. circuit, series-connected resistance loads respectively fed by the secondaries of said transformers, the resistance connected with the voltage transformer constituting a first potentiometer, a third resistance load connected in series with said two resistance loads and constituting a second potentiometer and supplying a circuit which is to be controlled, said first potentiometer being adjusted so that the secondary voltage of said voltage transformer bucks out substantially all of the secondary voltage of said current transformer when the motor is idling, said second potentiometer controlling the slope of the resulting straight-line relationship between the controlled voltage in said controlled circuit and the current in said A. C. circuit.

ANTHONY WINTHER.

REFERENCES CITED

The following references are of record in the file of this patent:

UNITED STATES PATENTS

| Number | Name | Date |
| --- | --- | --- |
| 1,923,754 | Seeley | Aug. 22, 1933 |
| 2,336,492 | MacKay | Dec. 14, 1943 |
| 2,406,781 | Lewis | Sept. 3, 1946 |

FOREIGN PATENTS

| Number | Country | Date |
| --- | --- | --- |
| 320,897 | Great Britain | Oct. 24, 1929 |
| 482,433 | France | Mar. 20, 1917 |